Jan. 26, 1954 G. S. LAWSON ET AL 2,666,952
APPARATUS FOR DISTRIBUTING RUBBER IN MOLDS
Filed Sept. 28, 1949 2 Sheets-Sheet 2
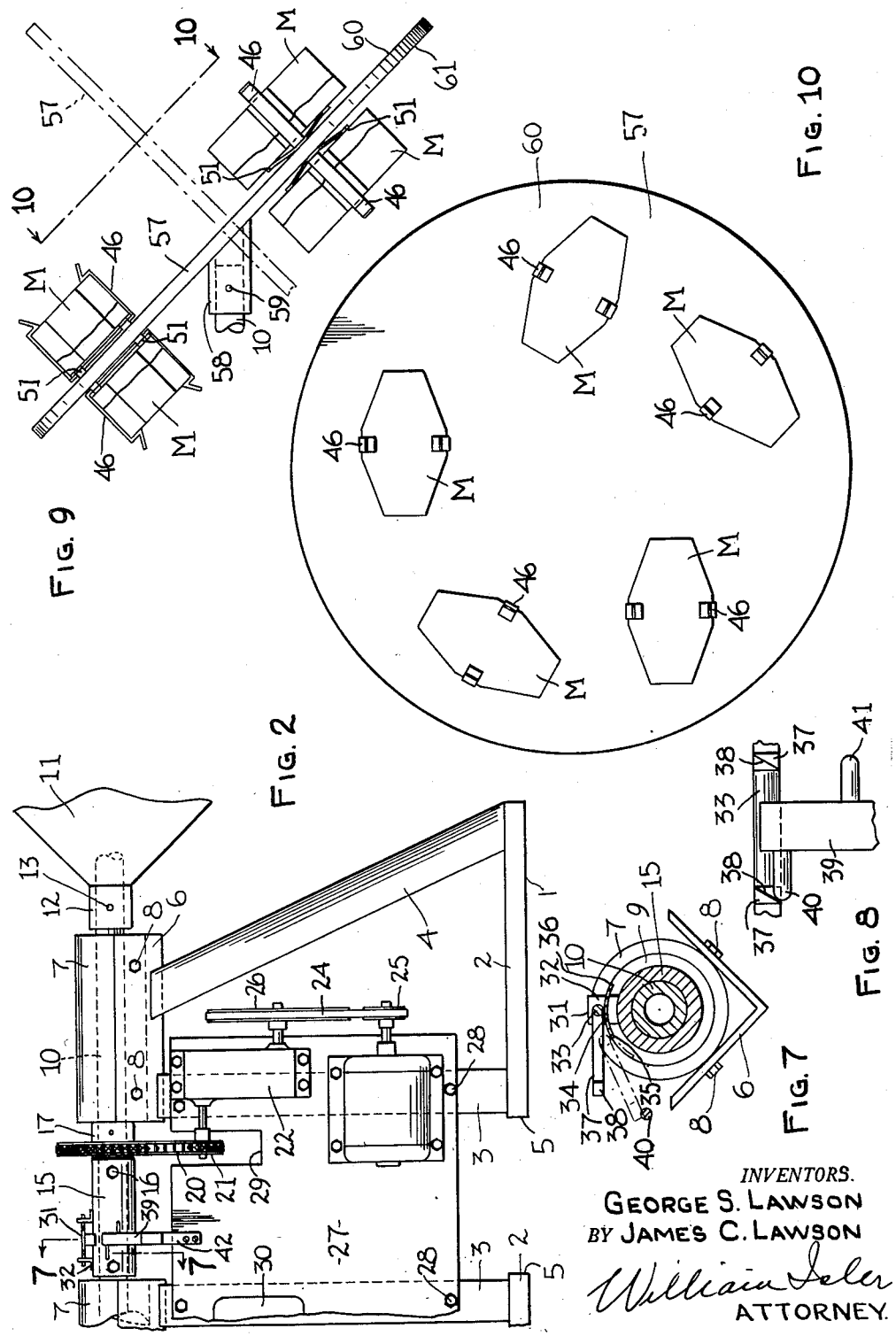
INVENTORS.
GEORGE S. LAWSON
BY JAMES C. LAWSON
William Soler
ATTORNEY.

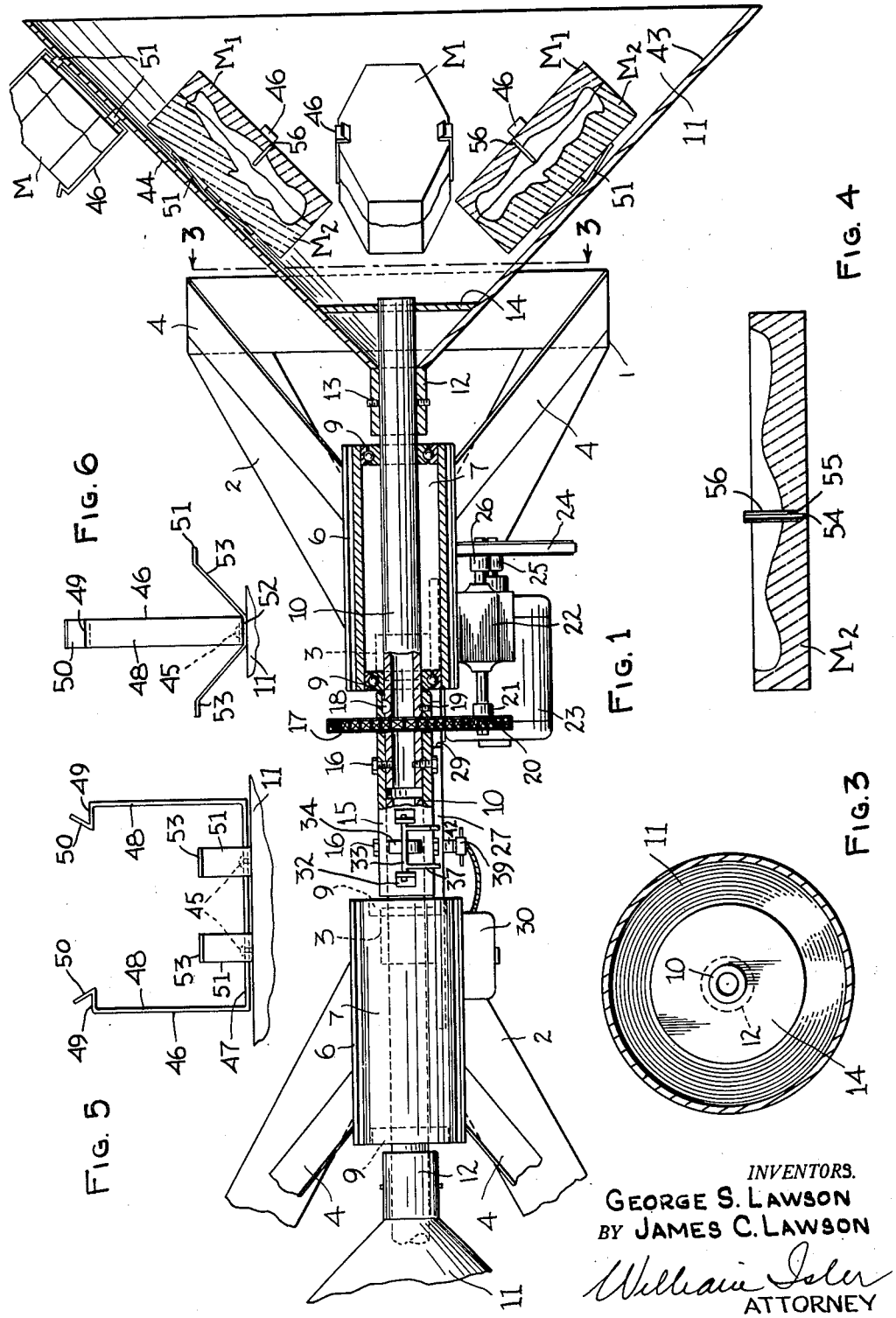

Patented Jan. 26, 1954

2,666,952

UNITED STATES PATENT OFFICE 2,666,952

APPARATUS FOR DISTRIBUTING RUBBER IN MOLDS

George S. Lawson, Perry, and James C. Lawson, Euclid, Ohio, assignors, by mesne assignments, to The Barr Rubber Products Company, Sandusky, Ohio, a corporation of Ohio Application September 28, 1949, Serial No. 118,208

2 Claims. (Cl. 18—26)

This invention relates, as indicated, to apparatus for distributing rubber in molds and is a continuation-in-part of our copending application, Serial No. 69,186, filed January 4, 1949, now Patent No. 2,583,955.

In our prior application, above mentioned, we have disclosed an apparatus which imparts rotation to the molds about two axes, one of said axes being normal to the other. Such compound rotative movement results in a complete or universal distribution of latex about the internal mold surfaces and produces a satisfactory hollow rubber product.

It has been our experience, however, that the apparatus which is required for the establishment of a compound rotary movement is cumbersome and expensive, as well as being composed of numerous expensive components which require considerable maintenance and replacement. Further, the area or space occupied by the apparatus is considerably greater we believe, than is warranted by the number of molds that can be mounted thereon.

Since the filing of our prior application, we have investigated further the subject of rubber distribution in molds and have developed apparatus in which a satisfactory distribution is obtained even though the molds are rotated only about a single axis, thereby obviating the aforementioned disadvantages which are attendant upon compound rotary movement.

Thus, it is a primary object of the invention to provide apparatus of the character described which is effective to distribute latex uniformly against the mold surfaces in the molding of hollow rubber articles, such as, for example, hollow rubber dolls.

Another object of the invention is to provide apparatus of the character described, through the use of which hollow rubber articles can be made quickly, inexpensively, and in large quantities, commercially.

A further object of the invention is to provide apparatus of the character described, which will prevent the formation of blisters or bubbles in the deposited latex or rubber.

Another object of the invention is to provide such apparatus which will have a large mold capacity in proportion to the space occupied by the apparatus.

Still another object of the invention is to provide novel means for supporting the molds on the apparatus, said means being shock absorbent and, further, permitting the molds to be quickly and easily mounted or removed from the apparatus.

Other objects and advantages of the invention will be apparent during the course of the following description.

In the accompanying drawings, forming a part of this specification, and in which like numerals are employed to designate like parts throughout the same, Fig. 1 is a top plan view of the apparatus embodying features of our invention, portions thereof being broken away to show details of the construction;

Fig. 2 is a fragmentary elevational view of the apparatus shown in Fig. 1, on a reduced scale;

Fig. 3 is a cross-sectional view of the mold supporting cone taken as indicated by line 3—3 on Fig. 1;

Fig. 4 is an enlarged cross-sectional view of the lower portion of a mold such as is utilized in the performance of our invention;

Fig. 5 is a front elevation of the mold clamp and support member which is utilized in the performance of our invention;

Fig. 6 is an end view showing the mold clamp and support member as viewed from the right of Fig. 5;

Fig. 7 is an enlarged fragmentary sectional view of the motor reversing mechanism taken substantially on line 7—7 of Fig. 2;

Fig. 8 is a fragmentary elevational view showing the reversing device engaging the switch, as it would appear when viewed from the left of Fig. 7;

Fig. 9 is a fragmentary side elevation showing a modified form of mold supporting unit; and Fig. 10 is a top plan view of the unit shown in Fig. 9 viewed as indicated by line 10—10 of Fig. 9, and showing the random positioning of the molds.

Referring more particularly to Figs. 1 to 8 of the drawings, we have illustrated apparatus designed to execute the method of latex distribution herein described.

The apparatus comprises a sturdy fabricated frame or supporting structure 1 formed of two horizontally spaced triangular bases 2 to which are secured suitable vertically extending uprights 3 and brace members 4.

The bases 2 are weldments made of channel iron or the like and are so arranged that the apex 5 of each triangular base is disposed inwardly so that the respective apices face each other.

Each upright 3, which for structural reasons may be in the form of cylindrical or rectangular tubing, is secured at one end as by welding adjacent the apex 5 of a base 2 and is welded at its other end to a horizontally disposed V-channel 6.

The rigid brace members 4 are welded to the base 2 adjacent the remaining two corners thereof and extend angularly upwardly to joinder with the V-channel 6.

Each V-channel 6 is thus supported by the frame structure 1.

Each V-channel, in turn, serves as a rest or support for a cylindrical sleeve 7, which is bolted to the V-channel by means of cap screws 8.

The sleeves 7 serve as housings for ball bearings 9 which are press-fit into the sleeve. One bearing 9 is disposed at each end of each sleeve and in each pair of bearings which are thus horizontally spaced, is journalled a hollow shaft 10 which extends or projects beyond each end of the sleeve 7.

On the outwardly extending end of each shaft 10 is secured, for rotation therewith, a mold supporting member which in this instance is a conical shell 11 the surface elements of which extend at an angle of 45° to the altitude.

To the vertex of the cone 11 is welded a short tubular sleeve 12 which is of such internal diameter as to be slidable over the shaft 10. The cone 11 is secured to the shaft by means of hollow headscrews 13 which extend through the sleeve 12 into the shaft 10. The shaft 10 extends through the sleeve 12 and also through a circular reinforcing plate 14 which is welded interiorly of the cone 11 to strengthen it.

It will be apparent from the description, thus far, that the apparatus embodies two identical units, each consisting of the frame 1, the cone 11 and the described intermediate supporting structure. The apparatus is specifically so designed so that the units may be operated in pairs or, if the operator so desires, one unit may be readily disconnected and the other unit may be operated by itself.

The drawings illustrate the paired structure which is the arrangement that would normally be used for greatest economy of operation.

A sleeve coupling 15 is utilized to interconnect the adjacent ends of the shafts 10 and cap screws 16 extend through the coupling 15 into the shafts 10 to secure the coupling in position.

One end of the coupling 15 is substantially in abutment with a bearing 9 in one sleeve 7 and the other end of the coupling abuts a chain sprocket 17 which is keyed as at 18 to one of the shafts 10 and may be additionally secured to the shaft by screws 19.

The sprocket 17 is connected by an endless chain 20 to a sprocket 21 which is mounted on the output shaft of a speed reducer 22. The speed reducer is driven by a reversing electric motor 23 through a V-belt 24 and pulleys 25 and 26.

Both the speed reducer 22 and the motor 23 are securely fastened to a plate 27 which in turn is secured as by cap screws 28 to the uprights 3 of the frame 1. The plate 27 may be suitably notched or recessed as at 29 to prevent interference with the chain 20.

A control box 30, which contains the necessary electrical relays and switching devices, may also be mounted on the plate 27.

Thus, the sprocket 17, the shafts 10 and the cones 11 are rotated by the motor 23, through the intermediary of the speed reducer 22, at a predetermined rate which in this instance may be from 1 to 2 R. P. M.

We have found it desirable, however, in order to obtain proper directional flow of the latex into undercut portions of the mold, to reverse the direction of rotation of the cones 11 at periodic intervals and for that purpose we embody in the apparatus an automatic motor reversing device 31 which in this instance is mounted on the sleeve coupling 15 and comprises two spaced supporting ears 32 in which is journalled a cam bar 33. To the underside of the bar 33 is welded an arcuate stop element 34 which is effective to limit the rotation of the cam bar about its own axis.

The stop 34 is of such predetermined dimension that when one end 35 thereof lies in abutment with the surface of coupling 15 the other end 36 thereof is spaced from the coupling surface. Thus maximum pivotal movement of cam bar is defined by abutment of the ends 35 and 36 of the stop 34, this movement being approximately through an angle of 20°.

Extending laterally from the bar 33 are two substantially parallel spaced arms 37, each of which is provided with a beveled or camming surface 38.

The arms 37 are adapted to operatively engage a sensitive double-action limit switch 39 of the "Micro-switch" type, having plunger actuators 40 and 41 disposed in offset relationship to each other. The switch 39 is effective to reverse the motor circuits and cause counter-rotation thereof. The switch is suitably supported by a bracket 42 which is secured to the plate 27.

Thus, when the shaft 10 is rotating counterclockwise as viewed in Fig. 7, one arm 37 will engage the plunger 40 and the camming surface 38 will depress the plunger and cause the switch 39 to effect reversal of the motor 23. This action will occur when the rotation of the bar 33 is arrested by abutment of the end 35 of the stop 34 with the surface of coupling 15.

The shaft 10 is then caused to rotate in a clockwise direction until the other arm 37 engages the plunger 41 and the camming surface 38 on the arm depresses the plunger to again cause reversal of the motor circuit This action will occur when rotation of bar 33 is arrested by abutment of the end 36 of stop 34 with the surface of coupling 15.

The floating action of the reversing device 31 thereby permits an overrun or overtravel of the shaft 10 slightly beyond one complete revolution thereby assuring complete distribution of the latex in the molds. On the inner surface 43 and the outer surface 44 of each cone 11 are secured, as by bolts and nuts 45, mold clamps 46 each of which is preferably formed from a strip of spring steel bent to provide a flat base portion 47, parallel upright portions 48 and inturned flange portions 49 at the upper ends of the upright portions. The flanges 49 are rebent to provide inclined portions 50.

Also secured by the bolts and nuts 45 are mold supports 51 which underlie the base portion 47 of the clamp 46 transversely thereof. Each support 51 is preferably formed of spring steel bent to provide flat attaching portions 52 and diverging mold rest portions 53.

The apparatus, as thus described, is designed primarily for the purpose of uniformly distributing liquid latex or rubber in molds used for the production of hollow rubber articles, such as dolls.

The molds M for this purpose, are formed of plaster-of-Paris, and consist of upper portions $M_1$ and lower portions $M_2$, each portion being hollowed out to form a portion of the doll. The lower portion $M_2$ is provided with a small aperture or opening 54 which extends to the exterior of the mold and which is counterbored as at 55 to receive and retain a short piece of plastic tubing 56 which forms an air vent. Preferably, the length of the tube 56 is such that it will extend well above the level of the predetermined quantity of latex which is poured into the mold M₂. However, if desired, the tube 56 may be of predetermined height and an excess of latex may be poured into the mold M₂ which excess will drain out through the tube 56 until the latex reaches the level of the end of the tube.

Assuming the first mentioned practice, the lower portion M₂ of each mold is filled with a predetermined quantity of liquid latex, sufficient in amount to form the entire doll, after which the upper portions M₁ are placed over the lower portions in order to close the mold.

The molds, as thus assembled, are then inserted in the clamps 46, as by pushing the molds downwardly past the inclined portions 50 of the clamps. These inclined portions facilitate such insertion of the molds by causing the upright portions 48 to be spread apart.

After the upper portion of the mold has passed the flanges 49, the upright portions 48, due to their resiliency, return to their normal position, causing the flanges 49 to embrace the mold so that it is securely clamped. This clamping action is enhanced by virtue of the fact that the resilient portions 53 of the mold supports 51 are depressed to some extent by the weight of the mold thereby urging the flanges 49 to bear more tightly against the mold.

The molds are thus securely clamped on the inner and outer surfaces 43 and 44 of the cones 11 and are resiliently supported in a manner which enables them to withstand shocks. The mounting of the molds is such, however, that they can be easily and quickly removed from the clamps when the molding operation has been completed.

Having described the details of the apparatus, the operation thereof will now be briefly described.

In any form of mold, except one which is designed for the formation of a completely spherical article, such as a ball, for example, the surfaces of the article forming cavity, although irregular in contour, can be resolved into certain major or general planes conforming to the prismatic outline of the mold cavity. Such prismatic outline can, in most instances, correspond to a rectangular or quadrangular prism in which the planes lie parallel to the principal axes of the cavity.

Inasmuch as we revolve the molds about only a single axis of rotation, it is necessary in the utilization of our method that the general planes of the cavity are neither parallel to nor normal to the axis of rotation about which the molds revolve. Thus, in the illustrated form of mold, the longitudinal axis or plane of the cavity defines a 45° angle with the axis of rotation of the shaft 10, and the transverse axis or plane likewise defines a 45° angle with the axis of rotation in one position of the mold while in another position it is coincident therewith.

In those instances where the general plane of a surface of the cavity is parallel to a plane of the mold itself, as it will be in most cases, then the cavity is properly oriented, according to our method, by merely aligning the plane of the mold with the inclined mold supporting surface of the member 11.

In those rare instances where the general planes of the surfaces of the cavity do not correspond or conform to the planes of the mold itself, the mold must be mounted with proper regard for the angularity of the cavity and with disregard for the angularity of the mold body per se.

Provided that the general plane of one surface of the mold cavity is properly inclined to the axis of rotation of the mold, no particular location or arrangement of the molds on the cones has been found necessary. The molds may be disposed in a desired manner and normally would be disposed in a manner which would permit maximum utilization of the surface area of the cones.

As indicated in the sectional view of the mold M in Fig. 1, initially the liquid latex lies entirely in the lower section M₂ of the mold. After the cone 11 has been rotated through approximately 180° the latex will have flowed to the upper section M₁ of the mold as indicated by the upper sectional view of the mold in Fig. 1, and approximately one-half of the mold cavity will have received an initial coating or deposit of latex.

Continued rotation of the cone through an additional 180° or more will cause latex to be deposited on the balance of the mold cavity surfaces.

Upon completion of slightly more than 360° of rotation, the rotation of the cones will be reversed in the manner heretofore described and successive incremental layers of latex will be deposited as the cycle is repeated.

Due to the angular inclination of the surfaces 43 and 44 of the cones 11 which, as previously stated, are disposed at an angle of 45° to the axis of rotation, complete coverage of the cavity surfaces is assured although the molds are revolved only about a single axis of rotation.

The tube 56 serves to form an opening in the wall of the molded rubber doll, which opening is utilized for the insertion of a whistle or noisemaker of the type commonly associated with such dolls.

However, the primary function of the tube 56 is to provide a vent for the entrapped air and water vapor in the mold cavity.

It has been our experience that in the absence of such a vent, sagging or bubbling of the deposited latex is likely to result, under certain conditions.

It is our belief that sagging or bubbling is likely to occur whenever the pressure interiorly of the mold cavity is less than the external atmospheric pressure. Such differential in pressure may come about due to the evaporation of the water in which the latex particles are dispersed, or as a consequence of temperature variations. In any event, the vent serves to equalize the pressure between the interior of the formed article or cavity and the atmosphere so that there will be no tendency for air to seep into the mold and cause deformation of the product or separation thereof from the mold cavity surfaces.

The molds remain on the cones 11 for a suitable period of time, say one hour, and are slowly rotated at the rate of 1 to 2 R. P. M. Upon expiration of said time, the molds are removed from the cones 11 and the dolls are further processed in a manner well known in the art and forming no part of the present invention.

In Figs. 9 and 10, we have shown a modified form of our invention in which we employ, in lieu of the cone 11, a disc or wobble plate 57, The wobble plate 57 is provided on both sides thereof with clamps 56 and mold supports 51, as previously described. The action of the wobble plate 57 is identical to that heretofore described in connection with the cone 11.

The plate 57 is secured to the shaft 10 for rotation therewith, as by sleeve 58 which is welded to plate 57 centrally thereof and has screws 59 extending therethrough into engagement with shaft 10.

The wobble plate 57 is so mounted relatively to the shaft 10 that its surfaces 60 and 61 are disposed at an acute angle, preferably 45° to the axis of rotation of the shaft 10.

The wobble plate is rotated and counter-rotated by the apparatus and in the cyclic manner heretofore described, and latex filled molds which are clamped thereon produce a hollow rubber product which is comparable to that produced on the cones 11.

Thus, by properly disposing the molds about a single axis of rotation, we are able to obtain a satisfactory hollow rubber article without resorting to the compound rotary motion which has heretofore been considered as indispensable to the production of a satisfactory and commercially saleable article.

By the use of the vent tube we prevent collapse or bubbling of the molded article and by use of resilient clamping arrangement we can secure or release the molds quickly and easily while at the same time enhancing the resistance of the molds to shock.

Our method and apparatus for the production of hollow articles, particularly the use of the conical members, greatly increases the quantity or number of articles which may be produced in a given area of floor space, as the conical surfaces allow greater mold capacity per machine than is available with compound rotary machines having flat tables which revolve about two angularly disposed axes of rotation.

Of equal importance is the fact that the form of apparatus which we have described is far less complex in structure and requires fewer parts than the apparatus presently used for applying compound rotary motion to molds. The apparatus is therefore far less expensive and is easier to maintain than compound rotation machines.

Although we have throughout this specification referred to the angularity of the mold supporting member 11 or 57 relatively to the axis of rotation as being 45 degrees, it will be apparent that deviations from this angle are permissible and may in some instances be desirable. In most instances, however, it is preferable than an angle of 45 degrees be utilized in order that optimum distribution of the aqueous dispersion material shall take place.

It is to be understood that the forms of our invention, herewith shown and described, are to be taken as preferred examples of the same, and that various changes in the shape, size and arrangement of parts may be resorted to, without departing from the spirit of our invention or the scope of the subjoined claims.

Having thus described our invention, we claim:

1. In an apparatus for effecting rotation of molds for producing hollow articles, the combination of a rotatable shaft, and a mold supporting member secured to said shaft axially thereof, said member having obverse and reverse surfaces inclined at an acute angle to the axis of rotation of said shaft and intersecting said shaft, said mold supporting member comprising a cone, the altitude of which is aligned with the longitudinal axis of said shaft.

2. In an apparatus of the character described, the combination of a horizontally disposed shaft, said shaft being supported for rotation about its longitudinal axis, and a conical mold supporting member secured to said shaft for axial rotation therewith, said member having obverse and reverse mold supporting surfaces, and each of said surfaces intersecting said shaft at an acute angle.

GEORGE S. LAWSON.
JAMES C. LAWSON.

References Cited in the file of this patent

UNITED STATES PATENTS

| Number | Name | Date |
|---|---|---|
| 803,799 | Voelke | Nov. 7, 1905 |
| 1,080,224 | Latcher | Dec. 2, 1913 |
| 1,592,536 | O'Neill | July 13, 1926 |
| 1,784,686 | Fauerbach | Dec. 9, 1930 |
| 1,875,031 | Landau | Aug. 30, 1932 |
| 1,998,897 | Kay | Apr. 23, 1935 |
| 2,222,266 | Rubissow | Nov. 19, 1940 |